N. H. FOOKS.
APPARATUS FOR HEAT TREATING FOODS OR OTHER SUBSTANCES.
APPLICATION FILED DEC. 22, 1919.
1,363,103.
Patented Dec. 21, 1920.
4 SHEETS—SHEET 1.
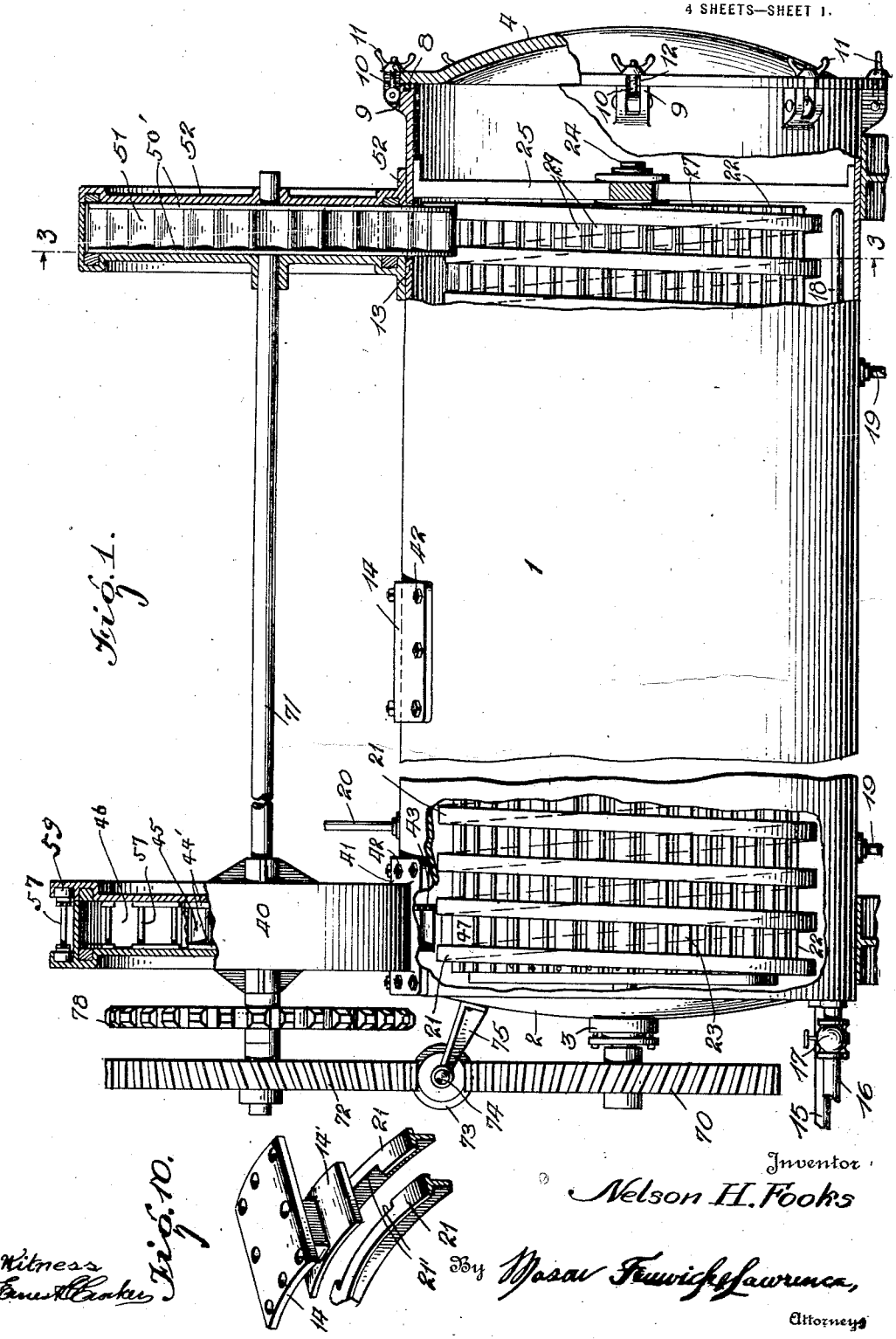
Inventor
Nelson H. Fooks
By Mason Fenwick Lawrence,
Attorneys
Witness
Ernest Cooker

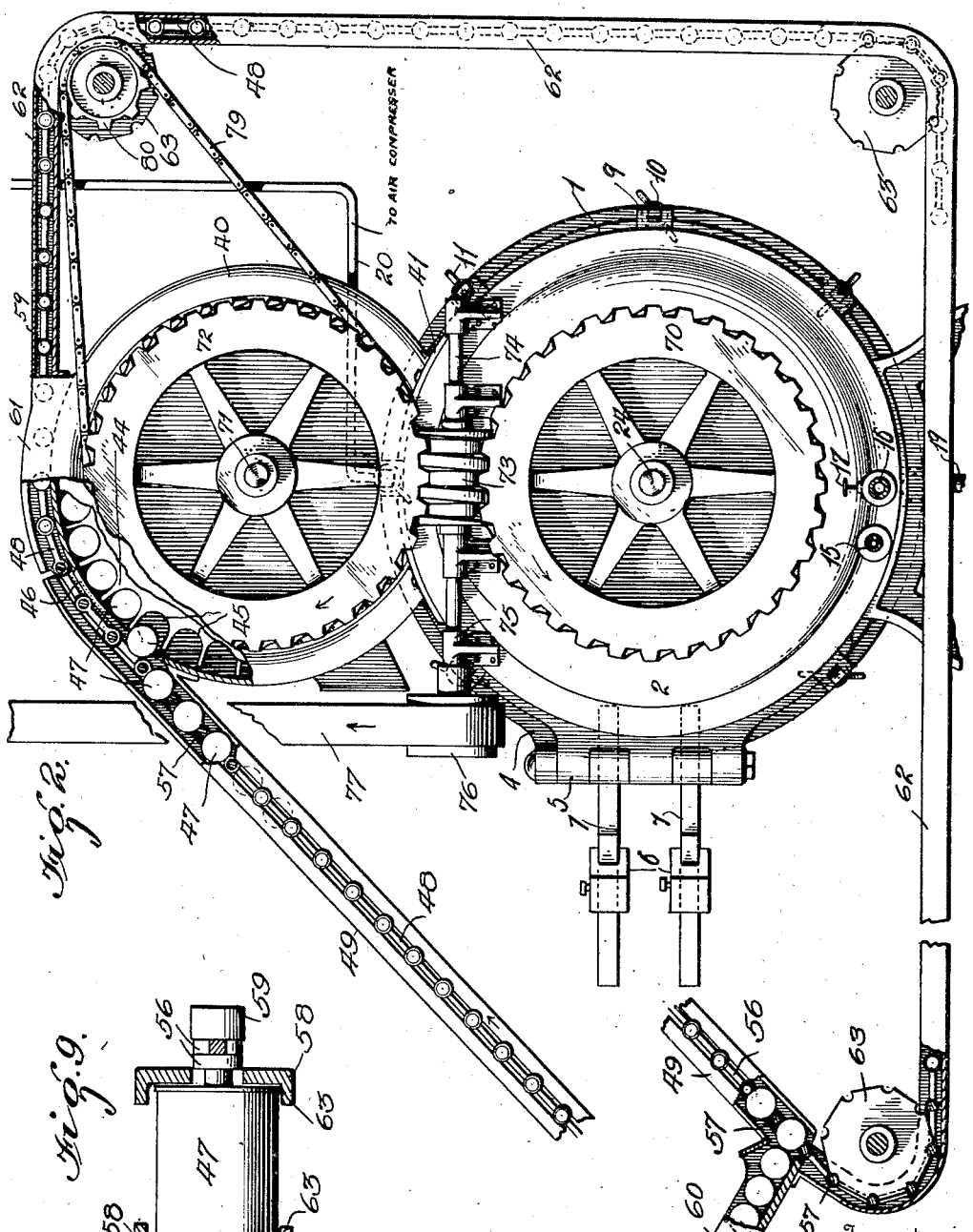

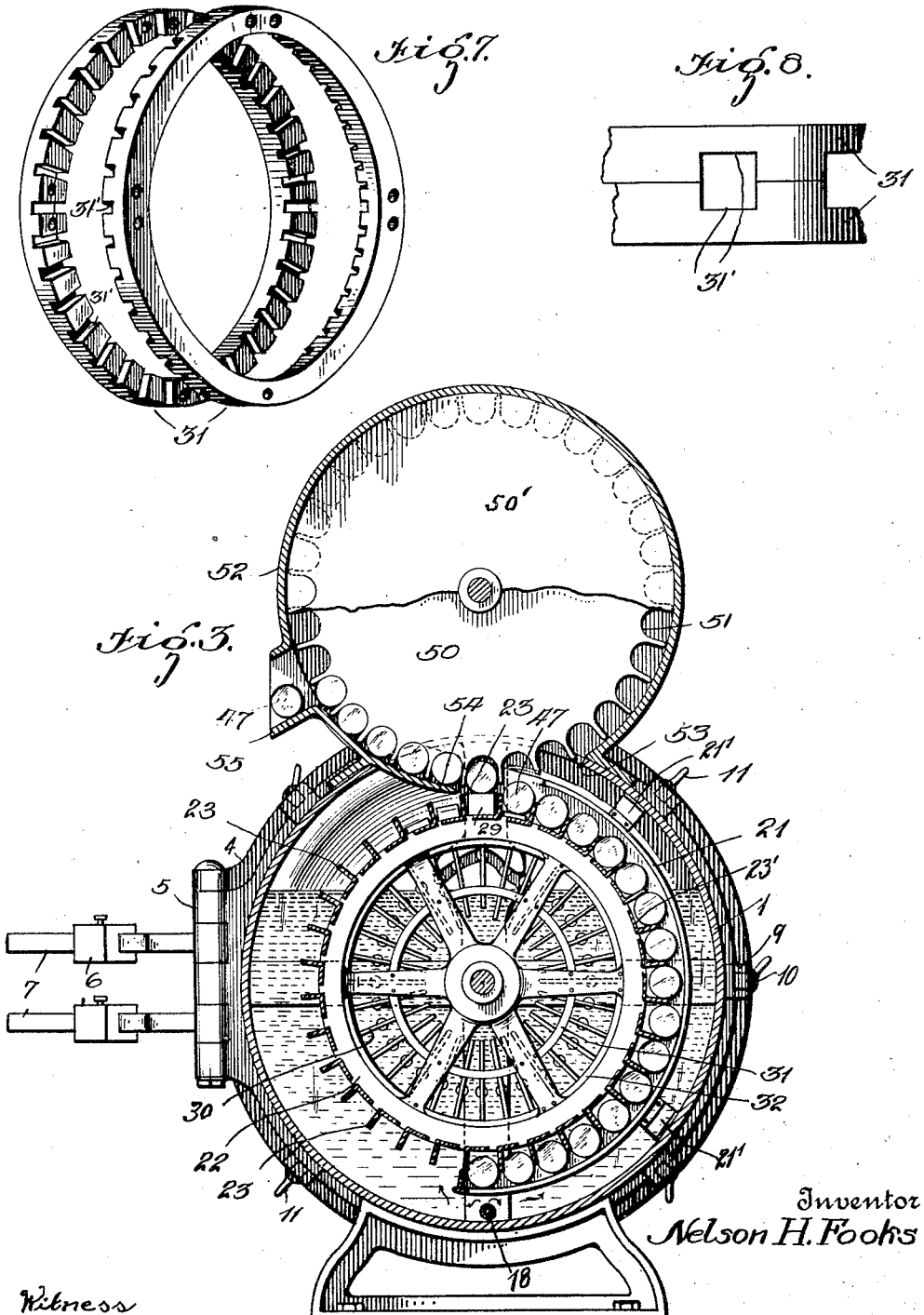

N. H. FOOKS.
APPARATUS FOR HEAT TREATING FOODS OR OTHER SUBSTANCES.
APPLICATION FILED DEC. 22, 1919.
1,363,103.
Patented Dec. 21, 1920.
4 SHEETS—SHEET 4.
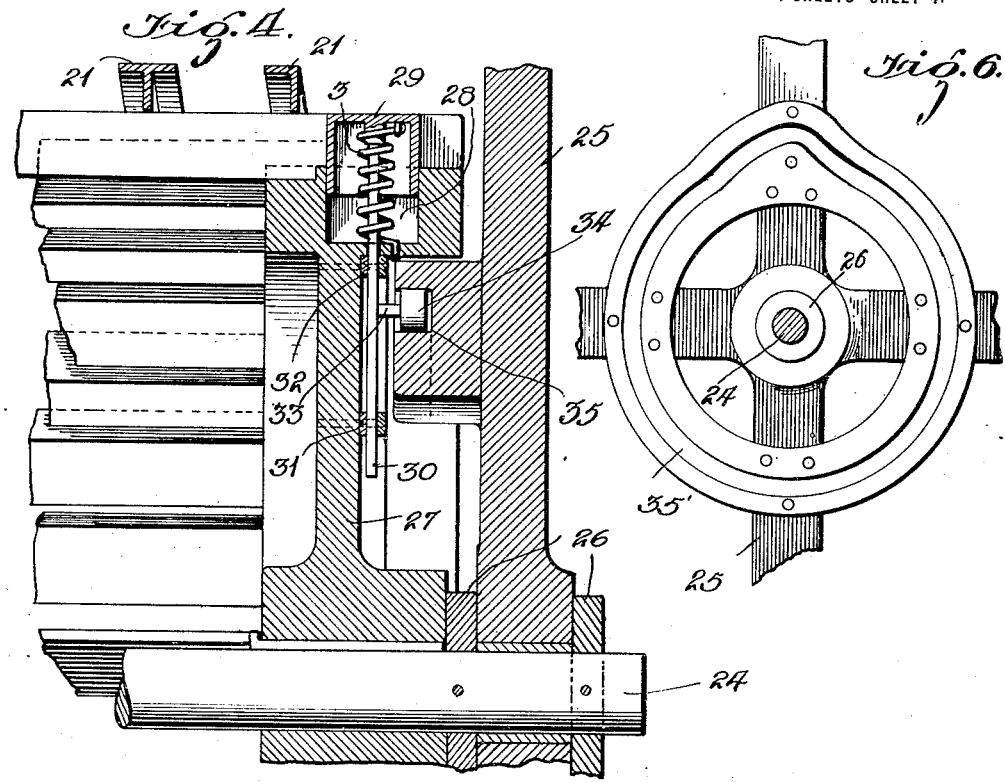
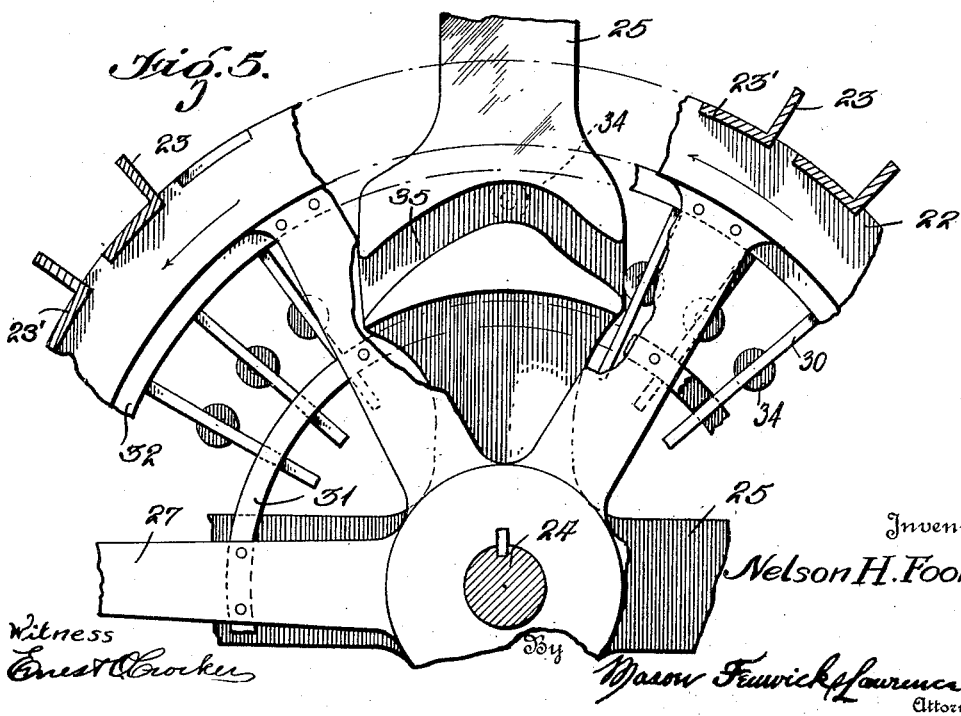

UNITED STATES PATENT OFFICE.

NELSON H. FOOKS, OF PRESTON, MARYLAND.

APPARATUS FOR HEAT-TREATING FOODS OR OTHER SUBSTANCES.

1,363,103.	Specification of Letters Patent.	Patented Dec. 21, 1920.

Application filed December 22, 1919. Serial No. 346,573.

*To all whom it may concern:*

Be it known that I, NELSON H. FOOKS, a citizen of the United States, residing at Preston, in the county of Caroline and State of Maryland, have invented certain new and useful Improvements in Apparatus for Heat-Treating Foods or other Substances; and I do hereby declare the following to be a full, clear, and exact description of the invention, such as will enable others skilled in the art to which it appertains to make and use the same.

This invention relates in general to the art of heat treating substances, but specifically to the treatment of substances in a retort containing a liquid bath heated to a temperature higher than its boiling point at normal atmospheric pressure but prevented from boiling by the pressure of a fixed gas upon it within the retort, by passing the substance into and through the bath in continuous succession, as through an air lock into the gas space, into and through the liquid, and out through the gas space and through the air lock to the outer air. This application is for an apparatus that is an improvement on the apparatus disclosed and claimed in my Patent No. 1,318,985, dated October 14, 1919, and, like the apparatus of said patent, it has been designed particularly for use in cooking food products in sealed cans by moving the cans continuously through a bath of water heated to a temperature above its boiling point at normal atmospheric pressure without material loss of efficiency through waste of steam at the time the cans enter and leave the retort.

A principal object of this invention is to provide an apparatus adapted to hold such a depth of liquid as will enable the path of travel of the objects being treated to extend throughout its greater portion beneath the surface of the bath. Other objects are to enable the treated bodies to be lifted from the conveying means within the retort through the top thereof; to synchronize the movements of the interior conveying mechanism with the movements of the charging and discharging mechanism; to improve the construction of the charging and discharging means; to provide means of ready access to the interior of the retort; to adapt the apparatus to permit of subjecting bodies to heat treatments of different duration without modifying the speed of the conveyers; and to accomplish other minor results as will more fully appear hereinafter.

The invention comprises a retort, or other container, having conveying means within it, charging and discharging mechanism delivering and receiving at or near the top of the retort or container; means for operating the several conveying, charging and discharging mechanisms synchronously; means for providing ready access to the interior mechanism; means for changing the charging points, and various details of construction hereinafter described.

In the accompanying drawings,

Figure 1 is a side elevation of a retort embodying the invention, parts being broken away, and parts being seen in section;

Fig. 2 is an end elevation with a part of the casing of the air lock and pocketed charging disk broken away, and with the elevating chute in which the chain conveyer travels partly in section;

Fig. 3 is a cross section on the line 3—3 of Fig. 1;

Fig. 4 is a fragmentary longitudinal section through the rotary conveying rack within the retort at its discharge end, and through the shaft hanger therefor and cam for operating the discharging plungers;

Fig. 5 is a fragmentary view showing the spider or spoked casting at the discharge end of the rack and of the plunger operating cam beyond it.

Fig. 6 is an elevation of a modified form of cam for operating the plungers;

Fig. 7 is a detail showing two rings, separated, that constitute guiding means for the plunger rods;

Fig. 8 is a fragmentary view of the guide rings assembled;

Fig. 9 is a section across the chain conveyer and elevating chute for delivering objects to the charging device;

Fig. 10 is a detail of a hatch cover and fragments of the stationary spiral guide within the retort.

Similar reference characters designate corresponding parts in the several views.

In its preferred form as shown in the drawings the invention comprises a retort or fluid tight container consisting of a strong cylindrical shell 1 of boiler plate; a fixed head 2, centrally perforated for the passage of a shaft 24 and provided with a suitable stuffing box 3; a head opposite the head 2 comprising a heavy door 4, hinged at 5, and counterweighted by weights 6 adjustably mounted on bars 7 projecting from the door in a direction suitable to counterbalance it in a manner to relieve the hinges from wrenching strains. The end of the shell 1 that is closed by the door 4 is suitably reinforced, provided with a packing gasket 8 and the usual bifurcated ears 9, to which are pivoted threaded bolts 10 carrying nuts 11, said bolts being adapted to clamp the door tightly closed by engagement with notches 12 in the edge of the door in a well known manner. In the top of the shell are a plurality of ports in horizontal alinement. One of said ports is the permanent and only discharge port and is at the end of the definite path of travel of the objects subjected to treatment within the retort and through which said objects must of necessity be discharged when they reach it,—while one or another of the other said ports is adapted to serve as an inlet or charging port for the bodies to be treated. In the drawings, two inlets or charging ports are illustrated but one of which can be used at any one time. The one shown in use, in Fig. 1, is that at the extreme left covered by the charging air lock, or casing with rotary pocketed charging disk, which is in communication with it; the other is illustrated as closed by a cover 14. The utility of these plural charging ports will be more fully explained hereinafter.

This retort, as has been stated hereinbefore, is intended to be used for heat-treating bodies in a water or other liquid bath heated to a temperature higher than the temperature at which it would boil in the external atmosphere surrounding the retort, while boiling or ebullition, with its objectionable evolution of steam or vapor under high tension, is prevented by a volume of air or other fixed gas maintained under pressure sufficient for that purpose within the retort above the liquid. In order to admit the water or other liquid conveniently and quickly, a pipe 15 of adequate size may be tapped into the retort through the lower portion of the head 2, and the passage of the liquid through said pipe 15 may be controlled by a suitable valve (not shown). In order to heat the liquid it is preferred to admit hot gas or steam which may be done through the pipe 16, provided with a controlling valve 17; and the pipe 16 may continue in a pipe or coil 18 within the retort. The pipe or coil 18 may have perforations in it to emit steam into the water, if water be used as the liquid bath. In order to empty the retort quickly two pipes 19 of ample dimensions may be tapped into the lower part of the shell 1, and may be provided with suitable control valves and unite in a suitable discharge main, not shown.

The air or other fixed gas may be conducted into the retort by a suitable gas pipe 20 which may enter the shell at any convenient point, but should preferably terminate within the retort at a point above the normal liquid level. This pipe 20 leads to the retort from an air compressor or any suitable supply of gas held under a pressure adequate for the purpose, as is well understood and therefore not shown.

Although this apparatus is adapted in principle to subject articles of various kinds to heat treatment in a liquid bath, it is particularly intended for cooking food substances contained in sealed cans. Certain canned foods need to be cooked for an extended period at relatively high cooking temperatures; but different foods vary greatly in their requirements of temperature and duration of subjection to high heat. This is very easily regulated in batch cooking, because the cans are merely required to be deposited in the retort, left there the length of time determined by experience for the particular substances being treated and then removed. Batch cooking, however, is uneconomical not only because of time lost in charging and discharging the batches, but also because of loss of heat during the intervals between discharging and recharging, and because of slow cooking owing to the fact that the cans remain still within the retort. Continuously moving and rolling or agitating the can in a tortuous path through a heating fluid is much more economical of time and heat. It requires, however, in order that the cans may remain a sufficient time within the treating fluid that the tortuous path of travel through the bath be as long as the dimensions of the retort will permit, and that the length of the path may be varied, or the rapidity of travel, or both, in order to accommodate the apparatus for cooking different kinds of food. Peas, for example, require a much shorter time for cooking than green or sweet corn.

As a suitable means for conveying cans or other objects through the heating bath over the longest practicable path in a given chamber or any selected fraction thereof, a spiral guide 21 is fixed within the shell 1, and a rotary rack 22 with longitudinal flights or guide ribs 23 on its perimeter is mounted within the turns of the spiral guide and concentric with them. The cans or other bodies entered at one end between two of the ribs 23 are rolled around the spirals of the guide way when the rack rotates, the spirals pushing the cans endwise between the guide ribs in the manner of a screw and nut. This type of means for moving cans in an extended path for purposes of continuous cooking is disclosed, for example, in a patent to F. W. Smith, #640234. With respect to the rotary rack coacting with a spiral fixed guide-way in a cylindrical retort, this invention is an improvement in an apparatus such as is shown in the said Smith patent. In this type of conveyer the path of the objects conveyed has a definite terminal, and is not endless.

The spiral guide 21 is formed of a T sectioned metallic shape such as a T-iron bent into a spiral coil with flanges on the convex side forming, as it were, a single-threaded screw, the insides of adjacent overlying flanges of the T-irons constituting the surfaces on which the cans, or other bodies, are rolled or slid. The T-irons are anchored to the shell 1 as indicated at 21'. Provision is made for admitting a can or other body between two adjacent turns of the T-iron wherever an inlet or charging port requires it, and for allowing the escape of a can to the exit or discharge port of the retort.

Concentrically mounted with respect to the turns of the T-guide 21 and shell 1 is a shaft 24 to which the rotary conveying rack 22 is keyed or otherwise secured. The rack 22 comprises a suitable number of spiders or spoked castings having hubs secured on the shaft 24 there being at least one spider at each end. The spider 27 at the outlet end is of a special construction to be hereafter described. Attached to the rims of the spiders are longitudinal equally spaced can or object carriers and guide-ribs 23, hitherto mentioned, each said rib constituting one flange of an angle iron, the other flange 23' of which constitutes a shelf that coacts with the ribs 23 to support and guide the objects. The shaft 24 projects through the stuffing box 3, hitherto mentioned, in order that it may receive a driving gear and is free to expand or contract lengthwise within the stuffing-box but not at its other end as will presently appear. The other end of shaft 24 has a bearing in the center of a spider-like shaft hanger 25, shown as a four-armed casting, the ends of the arms being secured firmly to the inner surface of the shell 1. A collar 26 is secured to the shaft at each side of the hanger 25, to prevent any endwise movement of the shaft at its inner end. These collars are shown conventionally in Fig. 4. This construction helps to prevent disturbance of the position of the discharge end of the rack 22 with respect to the discharge air lock or valve.
The spider 27 at the discharge end of the rack is a heavy spoked casting keyed to the shaft 24 and preferably held against any movement in the direction of the axis of the rack. A circular series of rectangular guiding pockets 28 is formed in the spider 27, one pocket between every two guide ribs 23. The walls of the pockets 28 are carefully machined. Plungers 29 of a circular series of plungers occupy the pockets 28.
Each plunger comprises a rectangular piston-like head guided in a pocket, and a plunger rod 30 projecting therefrom, radially toward the shaft 24. Each plunger rod 30 is guided by an orifice extending from the bottom of the pocket through the casting, and by two guiding orifices formed in rings concentrically mounted at different distances from the shaft 24. The said guiding orifices are formed respectively in two pairs of rings 31 and 32, bolted to the spokes of the spider 27. For convenience of manufacture each ring is made in two parts with rectangular notches 31' milled radially in their opposing faces, and bolted together and to the spider 27. A detail of a guide ring construction is illustrated in Fig. 7. Fig. 3 illustrates the entire series of plunger rods 30 each guided in guide orifices of the rings 31 and 32. Projecting laterally from each plunger rod 28 is a stud 33 carrying a roller 34. The roller 34 is adapted to travel in a cam groove 35 formed on a thickened portion of the upper arm of hanger 25, or in a member secured to said arm. Each plunger is held by the spring 30' normally with its outer face flush with or a little below the surface of the shelf 23' between the guide ribs 23 until it reaches, during the revolution of the rack 22, a point close to its highest point of travel whereupon the roller 34 enters the cam groove 35, and the latter forces the plunger 29 upward until its end surface is flush with the outer edges of the adjacent guide ribs 23, whereafter it is again retracted. The upper guide wall of the groove may of course be omitted.

In Fig. 6 is shown a modified form of cam for controlling the position of the plungers 29, which makes it possible to eliminate the springs 30'. This cam 35' has a continuous cam-groove with which the rollers 34 remain in engagement throughout a complete revolution of the rack thus making it impossible for any plunger to move from its retracted position until it reaches the discharging position in registration with the discharge port.

As illustrated in Fig. 1 the hanger 25 may be spaced from the door 4 an ample distance in order that a man may enter the retort to inspect or make repairs conveniently. The hanger 25, may, however, be set nearer the door 4 if it is deemed desirable to conserve this space in order to increase the length of the conveyer path relatively to the capacity of the container, without materially lessening the utility of the construction comprising a door of the full diameter of the retort.

In the apparatus disclosed in my former Patent No. 1318985, the treated bodies roll or slide from the discharge end of the rack into the outlet port where they are received into the pockets of the discharge disk. As the force of gravity is thus utilized to remove the bodies from the racks it is necessary that the discharge port be not higher, at least, than the horizontal level of the rack's axis; and this is true of all prior apparatus of the same general type so far as I am aware. By reason of the low level of the exit orifice in my said prior apparatus the level of liquid in the retort is correspondingly low since it is desirable in my process to discharge the bodies from the space above the liquid. But it is evident for most efficient treatment the level of the treating liquid should be high enough to keep the bodies subjected to treatment within the evenly heated liquid bath throughout substantially their entire path of travel through the retort, in order to avoid uneven heating owing to the passing of the bodies in and out of the heated water intermittently within the retort. In order, therefore, to maintain a high level of liquid within the retort, the entrance and exit openings are placed in line with each other at substantially the top or highest part of the shell 1. The treated bodies, therefore, must be lifted from between the ends of the guide-ribs 23 when they reach the point of discharge, and the means for so lifting them, in this particular embodiment of the invention, are the plungers and plunger operating mechanism heretofore described. But it will be clear that, to the broad purpose of maintaining a high level of liquid for efficiently processing the bodies in the retort, the particular lifting mechanism disclosed is not essential, but merely one of several that might be adopted.

As shown in Figs. 1 and 2, a cylindrical casing 40 is bolted to the shell 1 over one of the inlet or charging ports, a flange 41 having been formed on the casing and accurately fitted to the shell 1. The flange 41 is provided with bolt holes through which stud-bolts 42 are projected, the latter receiving nuts to clamp the flange securely to the shell. A suitable packing gasket is placed between the shell and flange 41, around the entrance opening. The casing 40 has an opening registering with the opening in the shell 1, substantially as illustrated in Fig. 3 for the discharge casing. A portion of the wall forming the perimeter of the casing 40 is projected into the retort through the shell 1 into close proximity to the cylinder described by the edges of the guide ribs 23 of the rotary rack 22, as shown at 43, and substantially similar to the construction of the outlet casing as illustrated in Fig. 3. Within the casing 40, a pocketed disk 44 is rotatably mounted. The disk 44 has a number of pockets in its periphery equally spaced apart and of a depth equal to or slightly greater than the diameter of the object to be fed into the retort. In the drawings these objects are illustrated as sealed cylindrical cans; and the pockets are designed so that the cans will fit neatly into them. The width of the pockets is substantially the same as the width of the guideway between the guide ribs 23 of the rack 22. The diameter of the pocketed disk 44 is shown as the same as that of rack 22, and the number of pockets 45 as equaling the number of guide ways in the said rack 22. The pocketed disk 44 has carefully machined plates 44' secured to each face and is fitted within the casing with a piston fit to prevent the escape of compressed air from the retort except that which will be trapped in the pockets as the carrier disk rotates. The casing 44 is provided with an entrance 46 for the bodies 47 to be treated. The casing 40 and pocketed disk 44 constitute an air lock or charging valve by which objects may be charged into the retort with minimum loss of pressure therefrom.

After treatment, the cans or other bodies are received by a pocketed disk 50 faced with plates 50', like the disk 44, of the same diameter and furnished with the same number of pockets 51, said disk 50 being fitted in a casing 52, so as to constitute an air lock or discharge valve adapted to prevent escape of any air or other fluid through the casing except as it may be carried around in the pockets 51. A flange 53 projecting from the casing is bolted to the shell 1, in the same manner as the flange 41 of the casing 40. A portion of the circumferential wall of the casing 52 is continued within the shell 1 down to the path of the edges of the guide ribs 23, as shown at 54 in Fig. 3, so that the said guide ribs will just clear the end of the continuation 54.

A discharge spout is formed at 55 in the casing 52. It will be remembered that as each guideway in the rotary rack 22 reaches its highest position the end of the plunger 29 will rise to the level of the edges of the guide ribs 23 and push an object 47 into a pocket 51, so that, as the disk 50 and rack 22 rotate at the same surface speed, the can or other objects will be moved over the lip of the extension guide 54, and so on to the discharge spout 55.

The cans or other objects are fed to the pocketed disk 44, by a conveyer comprising an endless chain carrier 48 and an upward inclined chute 49. The said chain carrier 48 consists of two series of links 56, of suitable length, pivoted together by cross pins 57 which are spaced from each other a distance determined by the diameter of the bodies to be conveyed, and are of a length determined by the length of said bodies. The chute 49 is preferably composed of four angle-bars 58 spaced from each other as shown in Fig. 9 so as to define in cross section a rectangle. The ends of the pins 57 project through the space or slot between the upper and under angle bars 58, and the links 56 are connected together on the pins 57 outside of the chute as shown. The extremities of the pins 57 are provided with rollers 59. At 60, (Fig. 2) there is shown a gravity chute arranged to deliver to the chute 49. The chute 49 is arranged on an upward incline, the gravity chute 60 delivering through an opening in its upper side at its lower end. The under flanges 63 of the two lower angle bars 58 are narrow and spaced apart such a distance that a body 47 such as a cylindrical can, will fall through should it by accident enter the chute 49 endwise between two pins 57 of the chain 48.

The chute 49 delivers to the pocketed disk 44 through an appropriate opening in its lower side, registering with an opening 46 in the casing 40. After the carrier chain leaves the chute 49 beyond the delivery point it passes through a box casing 61 formed on or attached to the valve casing 40, and through several sections of box casing 62, conventionally illustrated in Fig. 2, and also around three guiding sprocket wheels 63. The rollers 59 serve to guide the conveyer chain in its passage through the casings 61 and 62.

The movements of the pocketed disks 44 and 50 must be timed so said disks will rotate in synchronism with the rack 22, to cause the pockets 45 and 51 to register perfectly with the guide ways between the guide ribs 23 in order that the cans or other objects may be received accurately by the guideways directly from the pockets 45 at the entrance end and may be received by the pockets 51 from the guide ways at the exit end of the retort. The movements of the conveyer chain 48 must also be synchonized with the movements of the pocketed disk 44 in order that the objects may be properly delivered to the pockets 45. The gearing by which the moving parts are operated in correct time and speed ratios is as follows: A worm wheel 70 is keyed to the end of the shaft 24, before mentioned, which projects through the stuffing box 3. A shaft 71 to which the pocketed disks 44 and 50 are splined extends through both casings 40 and 52, and projects through the casing 40 to the perpendicular transverse plane of the end of the shaft 24. On this end of shaft 71 is secured a worm wheel 72 of the same pitch diameter and number of teeth as worm wheel 70. Engaging both worm wheels 70 and 72 is a worm 73, this arrangement being adapted to rotate wheels 70 and 72 at the same angular and peripheral speeds and consequently rack 22 on the one hand, and pocketed disks 44 and 50 on the other, at the same angular and peripheral speeds and in opposite directions. The worm 73 is secured to shaft 74 which is mounted in bearing brackets 75 projecting from the head 2. The shaft 74 carries a pulley 76 driven by a belt 77 from a suitable source of power, not shown. The conveyer chain 48 is driven from the sprocket wheel 78 mounted on the shaft 71, the sprocket chain 79, and the sprocket pinion 80 fixed to the shaft of one of the conveyer pulleys 63, the ratios between the sprocket wheels 78 and 80 and the conveyer pulley 63, being such that the linear speed of the chain 48 will exactly equal the peripheral speed of the carrier wheel 44.

By the described gearing the adjacent perimeters of rack and pocketed disks will be caused to move in the same direction at the same speed, and the chain conveyer will deliver objects to the pocketed disk 44 while moving in the same direction and at the same speed. In each operation of transferring an object from one conveying means to another the object is transferred from the grasp of one into the grasp of the other traveling with it in perfect registration, with minimum dropping of the object from one position to another and without any variation of speed of movement. Thus there is no chance of crushing or marring the object or misplacing it in the mechanism as when the object is moved from one conveyer to the other it is confined between the ribs and divisions between the pockets. While the pocketed disks 44 and 50 and the rack 22 are illustrated as of equal diameter and having an equal number of receiving pockets, it will be obvious that the essential characteristics are their equality of peripheral speed, the equal spacing of pockets and guide ways, and the direct transference of the bodies from the grasp of one to that of the other. Thus the diameter of the pocketed disks may be, for example, one half that of the rack 22 and its pockets 16 in number instead of 32, as shown, so long as the pockets are spaced the same as the guide-ways of the rack, the circumferential speeds are the same, and the ribs of the rack and the divisions between the pockets register in close proximity.

It will be understood that provision is made for the entrance of an object to be treated into the spiral guide way beneath the flanges of two adjacent turns of the T-shaped spiral guide 21 beneath each charging port or hatch way in shell 1. In Fig. 1 two charging ports are indicated, one covered by the casing 40 at the extreme left and one at an intermediate position closed by the cover 14. Directly beneath the latter port flanges of the T-guide are cut away as shown at 21′ in Fig. 10. When the hatch cover 14 is bolted in place a depending plate 14′ will close the space defined by the cut-away flanges at 21' and prevent any can or other object from accidentally escaping at that point, although gravity would render the escape unlikely as the cut away portion occurs at the top of the retort.

Assuming that the retort is to be used for cooking food in sealed cans, it is necessary to cook some foods longer than others. For example corn requires nearly twice as long a time as green peas and as the latter ripen earlier than the former, corn and peas will be treated at different times during the canning season. Should it be desired to cook canned peas the hatch cover 14 would be removed, the casing 40 and incased pocketed disk 44 together with the conveying chain and chute would be shifted, and the casing 40 secured at the port or hatch way uncovered by the removal of the cover 14. The cover 14 would then be bolted down over the port from which the casing 40 had been removed. After the season for canning peas had passed, the casing 40 and accessories would be placed over the charging port adapted to receive corn or whatever substance it might then be convenient to treat. Thus the length of time necessary to subject any particular substance to heat treatment may be controlled by starting it at such a point along the spiral pathway through the treating bath as will retain it within the bath a suitable period. Minor variations in time of treatment can of course be adjusted by variation of speed of the driving mechanism which may be provided for in any well known manner.

In preparing to use this apparatus, water or other liquid will be admitted through the pipe 15 until it reaches the desired level, for example, the level indicated in Fig. 3 or higher. Steam or other heating fluid will be turned into the pipe 18 to heat the liquid to the desired temperature. Having determined the degree of heat which the liquid bath shall attain, air or other fixed gas is forced in through the pipe 20 until the gas within the container exerts sufficient pressure to suppress ebullition of the liquid when it has reached the desired temperature. It will be understood that in practice a suitable safety valve, liquid level, pressure and temperature gages will be applied; or automatic devices responsive to variations of heat and pressure which can be set to regulate to a nicety the necessary pressure and temperature may be attached, all as is well known in the art of heating and of heat treatment within retorts.

In processing canned products the operation is as follows: Cans are placed in the chute 60 and roll to the chute 49 each successive can dropping between two pins 57 of the conveyer 48. If a can should chance to enter endwise it would drop through the chute 49 between the flanges 43 and be eliminated as a source of danger to the machine and itself be saved from destruction. The cans that enter properly are carried by the conveyer chain to the inlet opening 46 of the air lock casing 40 and delivered one after another to successive pockets 45 of the disk or valve 44, by which they are successively delivered at the point 43 into the starting ends of the guideways between the ribs 23 of the internal conveying rack. The rotation of the rack 22 causes each can to roll in a spiral path through the hot liquid bath until the end of its guideway on the rack is reached, when the can will have moved endwise fully over the top of a plunger 29, and the plunger will rise lifting the can to the level of the edges of the embracing ribs 23, into a pocket 51 of the disk 50. The disk 50 moving at the same rate of speed as the rack will push or roll the can on to the inclined member 54 and continue to move it around the inner periphery of the casing 52 until the outlet 55 is reached, when the cans will gravitate down the spout into any receptacle that may be provided.

Having thus described my invention what I claim as new and desire to secure by Letters Patent is as follows:

1. The combination with a retort having inlet and outlet orifices for liquid, means for admitting gas under pressure at a point within the upper portion thereof, heating means, and charging and discharging ports in the top of said retort; of means within the retort for conveying objects in a tortuous path from a point adjacent a charging port to a point adjacent a discharging port, charging and discharging air-locks comprising means for moving objects through said ports, and means for transferring objects from the conveyer to the discharging air-lock.

2. A retort, conveying means therein comprising a flanged object guide, a plurality of ports, an air-lock and a cover adapted respectively to close either of two ports interchangeably, said object guide having a recess in its flange, and a covering plate connected to the cover and adapted to close said recess in the guide flange when the cover is in place.

3. The combination of a container having a point of discharge, a conveyer adapted to convey objects in the container to a point adjacent the point of discharge, a movable lifter constructed and disposed so as to lift an object from the conveyer toward the point of discharge, and means for receiving the object from the lifter and discharging it, and means responsive to the movements of the said conveyer for actuating the lifter in proper timed relation with the movements of the conveyer.

4. The combination of a container having a point of discharge, a conveyer adapted to carry objects to a point adjacent said point of discharge, movable lifters mounted on the conveyer, and so disposed and arranged as to lift each object from the conveyer as it reaches the point adjacent the point of discharge, means for receiving the objects from the lifters and discharging them, and means responsive to the movements of the conveyer for actuating the lifters in proper timed relation with the movements of the conveyer.

5. A container, a conveyer therein, plungers mounted on the conveyer and normally retracted, a discharging means in the top of the container, and means operative to project a plunger so as to lift an object from the conveyer to the discharging means.

6. In a container, a conveyer having flights, plungers mounted on the conveyer between the flights and normally retracted, a discharging means moving in a path adjacent the outer edges of and higher than the flights, and means for projecting a plunger to elevate an object into the grasp of the discharging means.

7. In a container, a conveyer adapted to rotate about a horizontal axis and having parallel flights for holding objects between them, plungers seated between the flights, a rotary discharging device above the conveyer having object receiving means moving above and in registry with the spaces between said flights, and means for elevating a plunger in response to the rotation of the conveyer when said plunger is uppermost to deliver an object to the discharging device.

8. In a container, a rotary rack having ribs, radial plungers seated between the ribs, a rotary discharging device having pockets corresponding in width to the spaces between the ribs of said rack, the cylindrical paths described by the edges of said ribs and by the divisions between said pockets being adjacent, a curved guide conforming to the periphery of said discharging device and terminating at the point of divergence of said cylindrical paths, means for rotating said rack and discharging device at equal peripheral speeds in opposite directions, and means for successively projecting the plungers so as to project objects clear of the conveyer into the pockets of the discharging device.

9. The combination with a container, of a rotary conveyer rack having object guide ways, a fixed object guide coöperating therewith, said rack and fixed object guide adapted to cause the objects to travel in a tortuous path within the container from one end of the rack to the other, and to a terminal above the rack, a discharge device at the terminal point, and means movable with respect to the conveyer and fixed portions of the container to lift the objects from the conveying means to the discharging device.

10. The combination of a container, a rotary ribbed rack therein, means coöperating therewith to cause the objects to travel in a spiral path within the container from end to end of the rack between the ribs, normally retracted plungers between the ribs at the terminal of the path of the objects between said ribs, a discharging device, and means arranged to elevate each plunger in succession to elevate the objects from the rack to the discharging device.

11. The combination of a container, with a rotary conveyer therein and a discharge device to receive objects from the rotary conveyer, plungers for transferring objects from the conveyer to the discharging device, and a cam fixed to the container and arranged to elevate the plungers sucessively to transfer objects successively from the conveyer to the discharging device.

12. In a container a rotary rack having guide ribs, and means coöperating therewith to move objects between the guide ribs from end to end, a spider supporting said guide ribs at the terminal end, pockets in the perimeter of said spider between said ribs, normally retracted plungers in said pockets, suitable guides for the plungers, and means for projecting each plunger in succession when an object has reached the terminal and lies over a plunger.

13. A container having a closure constituting one end wall adapted to be opened and closed, and a permanently closed opposite end wall, a shaft hanger within the container, a shaft having one end journaled in said hanger and its other end journaled in said permanently closed end wall of the container and projecting therethrough, and mechanism operated by the shaft within the container.

14. A container having a shaft hanger within it provided with a shaft bearing, a shaft journaled at one end in said bearing, thrust members to prevent longitudinal movement of the shaft in said hanger bearing, a stuffing box in the wall of the container through which the other end of the shaft projects, a conveyer secured to the shaft, a charging port, a discharging port adjacent the said shaft hanger, and means adapted to remove objects from the conveyer and discharge them through the discharge port.

15. The combination of a container having charging and discharging means, a shaft hanger within the container secured to the wall thereof adjacent the discharging means, a shaft having one end journaled in the hanger and provided with thrust bearings engaging the hanger, the other end of said shaft extending through the wall of the container to receive a driving means, a rotary conveying rack secured to the shaft, radially movable plungers in the end of the rack adjacent the hanger, and a cam on the hanger adapted to successively project the plungers to transfer objects to the discharging means.

16. The combination of a container, a conveyer therein, endless charging and discharging means in axial alinement, adapted to deliver objects to and receive them from said conveyer, a shaft for the conveyer, a shaft to which said rotary charging and discharging means are secured, said shafts being parallel, worm wheels on said shafts, a worm disposed between and in mesh with said worm wheels, and means for rotating the worm; said gearing, rotary conveyer and charging and discharging means being so proportioned as to give uniform surface speed to the conveying, charging and discharging means.

17. The combination of a container, a conveyer therein, a shaft for operating the conveyer, endless charging and discharging means in axial alinement adapted to deliver objects to and receive them from said conveyer, a shaft arranged parallel with said conveyer shaft to which the charging and discharging means are secured, a conveyer delivering to the charging means, means driven from said shaft to which the charging and discharging means are secured for operating said delivering conveyer, and a worm located between and engaging the worm wheels so as to drive them in opposite directions, the proportions being such as to move the charging and discharging means, the conveyer within the container, and the delivery conveyer, at the same surface speed and with all contiguous pairs of conveying surfaces moving in the same direction.

In testimony whereof I affix my signature.

NELSON H. FOOKS.